US006550485B2

(12) United States Patent
Oka et al.

(10) Patent No.: US 6,550,485 B2
(45) Date of Patent: Apr. 22, 2003

(54) WASHING METHOD FOR DISTILLATION SYSTEM OF NITROGEN-CONTAINING POLYMERIZABLE MONOMERS

(75) Inventors: Yoshihisa Oka, Chigasaki (JP); Kenichi Takematsu, Yokohama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/956,895

(22) Filed: Sep. 21, 2001

(65) Prior Publication Data

US 2002/0040725 A1 Apr. 11, 2002

(30) Foreign Application Priority Data

Sep. 29, 2000 (JP) .......................................... 2000-298316

(51) Int. Cl.[7] .................................................. B08B 9/00
(52) U.S. Cl. .............................. 134/22.1; 134/2; 134/3; 134/22.11; 134/22.12; 134/22.14; 134/22.18; 134/22.19; 134/36; 134/41; 134/42
(58) Field of Search ............................... 134/2, 3, 22.1, 134/22.11, 22.12, 22.14, 22.18, 22.19, 36, 41, 42

(56) References Cited

U.S. PATENT DOCUMENTS

| | | | | | |
|---|---|---|---|---|---|
| 3,406,210 A | * | 10/1968 | Hagemeyer et al. | ......... | 252/397 |
| 3,705,190 A | * | 12/1972 | Bockstahler et al. | .... | 260/486 R |
| 3,762,952 A | * | 10/1973 | Gouin et al. | ................... | 134/38 |
| 4,293,347 A | * | 10/1981 | Haschke et al. | ............... | 134/11 |
| 4,654,450 A | * | 3/1987 | Miller | ............................ | 585/5 |
| 4,754,058 A | * | 6/1988 | Levy | .......................... | 560/205 |
| 5,157,175 A | * | 10/1992 | Lewis et al. | .................... | 585/5 |
| 5,241,022 A | * | 8/1993 | Watanabe et al. | ............. | 526/62 |
| 5,744,672 A | * | 4/1998 | Kourbatov et al. | .......... | 585/440 |
| 5,769,959 A | * | 6/1998 | Johnson et al. | .......... | 134/22.17 |
| 6,210,536 B1 | * | 4/2001 | Grossi et al. | ................... | 203/8 |

* cited by examiner

Primary Examiner—Sharidan Carrillo

(57) ABSTRACT

There is provided a method of efficiently removing polymer stuck to the inside and/or on the surface of packings of a distillation tower, when nitrogen-containing polymerizable monomers (for example, ethyleneimine) are distilled. Said method consists of washing the inside and/or packings of a distillation tower with an acidic liquid (for example, aqueous solution of acetic acid).

10 Claims, No Drawings

WASHING METHOD FOR DISTILLATION SYSTEM OF NITROGEN-CONTAINING POLYMERIZABLE MONOMERS

FIELD OF APPLICATION IN INDUSTRIES

The present invention relates to a washing method for distillation system of nitrogen-containing polymerizable monomers. Specifically the present invention relates to a method of efficiently removing the polymer formed in the distillation system and/or at the surface of packings when nitrogen-containing polymerizable monomers are distilled.

PRIOR ART

Polymers excellent in properties such as water-solubility, reactivity etc. are obtained from nitrogen-containing polymerizable monomers such as ethyleneimine, vinylpyrrolidone, allylamine, vinylformamide etc. and said polymers have been used in many applications. Nitrogen-containing polymerizable monomers are produced by various processes but the products contain, besides the monomers, unreacted starting materials and by-products, so it is necessary to separate and purify the monomers and to recover unreacted starting materials. The separation, purification and recovery have been conducted usually by distillation.

As nitrogen-containing polymerizable monomers, however, have high reactivity, polymerization of monomers themselves and polymerization of monomers with starting materials or by-products often occur during distillation and the polymer stuck to the inside of the distillation system and/or on the surface of packings provokes various problems such as lowering of separation performance, increase of pressure loss etc. of the distillation tower. In order to avoid such polymerization at the time of distillation there have been used radical polymerization inhibitors such as phenothiazine, hydroquinone etc. or various stabilizers. After operation for a long time, however, formation of polymer is observed and its removal is necessary. Therefore the polymer used to be removed by a mechanical method such as scrubbing with a brush etc.

Problems the Invention is going to Solve

The polymer, however, is tightly stuck to the inside of the distillation system and/or on the surface of packings, it is not easy to remove it by a mechanical method. Therefore, washing has required a long time and the productivity has been remarkably decreased due to the shutdown of the production plant during the washing.

The purpose of the present invention is to solve the above-mentioned problems and to provide a method of efficiently removing the polymer stuck in the distillation system and/or on the surface of packings when nitrogen-containing polymerizable monomers are distilled.

Means of Solving the Problems

According to the research by the present inventors it was found that the polymer can be easily removed by washing treatment with an acidic liquid. The present invention was completed based upon such knowledge.

Thus, according to the present invention, a washing method for distillation system of nitrogen-containing polymerizable monomers characterized by washing the inside of the distillation system of nitrogen-containing polymerizable monomers and/or packings with an acidic liquid is provided.

MODE FOR CARRING OUT THE INVENTION

"Distillation system" in the present invention includes distillation tower, equipment attached to distillation tower, for example, heat exchanger, piping which connects them etc. Distillation tower is not particularly restricted but may be anything generally used and may be packed with packings or not. According to the method of the present invention the polymer formed in such distillation tower, heat exchanger, piping, packings etc., when products containing nitrogen-containing polymerizable monomers or crude nitrogen-containing polymerizable monomers are purified, can be efficiently removed.

"Nitrogen-containing polymerizable monomers" in the present invention means a monomer containing nitrogen that easily forms polymers at its purification by distillation. As specific examples, there can be mentioned N-alkenyl-carboxylic acid amides such as N-vinylformamide, N-vinylacetamide, N-vinylpyrrolidone etc.; nitrogen-containing cyclic vinyl compounds such as N-vinylpyridine, 4-vinylpyridine, 2-vinylpyridine, N-vinylpyrrole, N-vinylimidazole, N-vinylmorpholine etc.; aminoacrylates such as dimethylaminoethyl acrylate, diimethylaminoethyl methacrylate etc.; acrylamides such as acrylamide, methacrylamide, methylene-bis-acrylamide, N-methylolacrylamide, diacetoneacrylamide etc.; vinyloxazolines such as 2-vinyl-2-oxazoline, 2-isopropenyl-2-oxazoline etc.; alkyleneimines such as ethyleneimine, 2-methylethyleneimine, 2-ethylethyleneimine, N-alkylazilydine etc.

"Acidic liquid" in the present invention is at least one acid itself selected from inorganic acids and organic acids (in case the acid is liquid) or its solution (usually aqueous solution). As specific examples of inorganic acids there can be mentioned mineral acids such as hydrochloric acid, sulfuric acid, nitric acid, phosphoric acids (orthophosphoric acid, metaphosphoric acid, pyrophosphoric acid) etc. As specific examples of organic acids there can be mentioned carboxylic acids such as formic acid, acetic acid, citric acid, glycolic acid, lactic acid, succinic acid, malic acid, oxalic acid, gluconic acid etc.; sulfonic acids such as methanesulfonic acid, p-toluenesulfonic acid, dodecylbenzenesulfonic acid etc.; phosphonic acids such as 1-hydroxyethylidene-1,1-diphosphonic acid, aminotrimethylenephosphonic acid etc. Among these acids, carboxylic acids having volatility, for example, acetic acid, are preferably used. As they evaporates without remaining in the distillation system and/or on the surface of packings, the inside of the distillation system and/or the surface of packings can be prevented from corrosion by a remaining acid. In case of using an aqueous solution its acid concentration can be suitably selected in such a range as a removing effect of polymer is obtained. Among the acidic liquid of the present invention, acetic acid and its aqueous solution are particularly preferably used.

In the method of the present invention it is preferable to wash the distillation system with water, after the above-mentioned washing with an acidic liquid, in order to remove the acid remaining in the distillation system and/or on the surface of packings.

According to the method of the present invention, the polymer formed and stuck, in the inside of distillation tower, heat exchanger, piping etc. or on the surface of packings, in case the distillation tower is packed with said packings, when products containing nitrogen-containing polymerizable monomers or crude nitrogen-containing polymerizable monomers are purified, can be removed by washing with an acidic liquid. Temperature of washing is in the range of 0–200° C., preferably 0–150° C. If the temperature is too high, the corrosion of equipment is severe. If, on the other hand, the temperature is too low, the washing power decreases and the operability is poor.

The method of the present invention can be carried out according to various modes. For example, ① in case the distillation tower is packed with said packings, the polymer stuck in the distillation tower and on the surface of packings can be washed and removed by introducing an acidic liquid into the inside of the distillation tower as it is, without taking out the packings of the distillation tower. Further, ② the polymer stuck on the surface of packings can be removed by washing the packings with an acidic liquid after taking them out of the distillation tower. (Usually both the inside of the distillation tower and packings are washed. According to the extent of polymer sticking, however, only inside of the distillation tower or only packings may be washed.) Moreover, ③ in case of heat exchanger, piping etc. the polymer stuck on their inner surface can be removed by introducing an acidic liquid into all of them or each individually.

The above-mentioned washing with an acidic liquid can be conducted, for example, in case of a distillation tower, in various methods such as flushing, circulation of bottom liquid to the tower top, distillation or total refluxing in supplying the distillation tower with an acidic liquid. The above-mentioned washing with water can be conducted in a similar manner.

In case of packings the polymer can be removed more efficiently by combining the above-mentioned washing with a mechanical washing by using a brush etc.

Effect of the Invention

According to the method of the present invention the polymer stuck in the distillation system and/or on the surface of packings can be efficiently removed. The productivity is improved by shortening time of the removal operation compared with the operation by using the conventional mechanical method.

EXAMPLES

Then, the present invention will be described more specifically by examples. Parts and % mean parts by weight and % by weight, respectively.

Example 1

Polymer was taken from a rectifying tower for ethyleneimine after a continuous operation for 5 months and its dissolution property to various solvents was tested. Namely, the polymer and 30 parts of a solvent for a part of the polymer were placed in a sampling bottle and stirred at room temperature for 24 hours. Results are shown in Table 1.

TABLE 1

| Solvent | State of the stuck polymer |
| --- | --- |
| Water | insoluble |
| 20% Aqueous solution of acetic acid | partly dissolved and broke down into small particles |
| 10% Aqueous solution of sulfuric acid | partly dissolved and broke down into small particles |
| 10% Aqueous solution of sodium hydroxide | insoluble |
| Dimethylformamide | insoluble |

From Table 1 it is evident that an acidic liquid is effective for removal of the polymer. In other cases than acidic liquid no change in state was observed even after continuous stirring for more than a week.

Moreover, the polymer was not easily removed by mechanical washing such as scrubbing packings, on which polymer was stuck, with a brush etc., after soaking them in pure water at normal temperature for 24 hours.

Example 2

Operation of a rectifying tower for ethyleneimine (packed with packings) was stopped after a continuous operation for 5 months and, after taking out the bottom liquid of the rectifying tower, a circulation operation was conducted at 80° C. for 12 hours in feeding a fixed amount of 20% aqueous solution of acetic acid to the middle of the rectifying tower. After taking out the aqueous solution of acetic acid, a steam distillation was conducted in feeding pure water to the middle of the rectifying tower. No polymer was observed on the surface of packings taken out of the rectifying tower after the water washing. The aqueous solution of acetic acid used for the washing was colored and contained small particles of polymer that were supposed to have been stuck on the packings.

Example 3

Operation of a recovering tower for monoethanolamine (packed with packings) that separates by distillation monoethanolamine, the unreacted starting material, from a reaction product in an ethyleneimine production plant was stopped after a continuous operation for 5 months and the packings were taken out of the rectifying tower. The polymer stuck on the packings were completely removed after the packings were soaked in a 20% aqueous solution of acetic acid at normal temperature for 24 hours and washed with water. In the operation of the recovering tower for monoethanolamine after putting the washed packings back to the tower, the same recovery rate as at the beginning of usage was obtained. Pressure loss was the same.

What is claimed is:

1. A method for washing a distillation system which has been used for distilling alkyleneimines, comprising the steps of providing a distillation system having polymerized alkyleneimines therein, and washing an inside of the distillation system with an acidic liquid to remove the polymerized alkyleneimines therein.

2. The method set forth in claim 1, further comprising the step of washing the inside of said distillation system with water.

3. The method set forth in claim 1, wherein the acidic liquid is a mineral acid selected from the group consisting of hydrochloric acid, sulfuric acid, nitric acid and phosphoric acid, or an aqueous solution thereof.

4. The method set forth in claim 1, wherein the acidic liquid is an organic acid selected from the group consisting of carboxylic acids, sulfonic acids and phosphonic acids, or an aqueous solution thereof.

5. The method set forth in claim 1, wherein the acidic liquid is acetic acid or an aqueous solution thereof.

6. A method for washing packings packed in a distillation system which has been used for distilling alkyleneimine, comprising the steps of providing a distillation system having packings therein, said packings having alkyleneimines therein, and washing said packings of the distillation system with an acidic liquid to remove the polymerized alkyleneimines therein.

7. The method set forth in claim 6, further comprising the step of washing the packings of said distillation system with water.

8. The method set forth in claim 6, wherein the acidic liquid is a mineral acid selected from the group consisting of hydrochloric acid, sulfuric acid, nitric acid and phosphoric acid, or an aqueous solution thereof.

9. The method set forth in claim 6, wherein the acidic liquid is an organic acid selected from the group consisting of carboxylic acids, sulfonic acids and phosphonic acids, or an aqueous solution thereof.

10. The method set forth in claim 6, wherein the acidic liquid is acetic acid or an aqueous solution thereof.

* * * * *